Patented Nov. 15, 1932

1,887,726

UNITED STATES PATENT OFFICE

LOUIS WEBER, OF CHICAGO, ILLINOIS

INSULATING PAPER

No Drawing.    Application filed February 14, 1930. Serial No. 428,492.

The present invention relates to improvements in heat insulation.

The conservation of heat is an important problem in the industries. Numerous kinds of heat insulating materials are employed to this end. The insulating material may be in the form of a plastic cement or paste which is applied to the surfaces to be covered and then permitted to set or dry, or in the form of paper which is wrapped about or applied in any other suitable manner to the surfaces. The present invention relates to the last form.

Insulating paper should have high heat insulating properties, i. e. an extremely low heat conductivity, should be able to withstand high temperatures and in general to withstand a large amount of heat, and should be durable. I have discovered a heat insulating paper which has these properties to an unusual extent.

Insulating paper made in accordance with my invention has a composition which comprises generally slag wool, asbestos fibre and a binder.

The slag wool (mineral fibre or silica fibre) is obtained in a well-known manner by blowing a blast of saturated steam through a spray of molten mineral slag. I have discovered that slag wool obtained from lead slag is particularly advantageous in that it possesses unusually high insulating and heat resisting properties.

Any suitable binder capable of withstanding high temperatures may be used. Preferably, I employ a colloidal clay, such as Wyoming or Montana clays.

While the invention is susceptible of various changes, I prefer to employ the foregoing ingredients in substantially the following proportions by weight:

| | Per cent |
|---|---|
| Slag wool fibre | 80 |
| Asbestos fibre | 15 |
| Colloidal clay | 5 |

In making the paper, the foregoing ingredients are mixed together. Sufficient water is added to the mixture to form a slush. The slush is then run through a regular paper making machine in which the insulating paper is collected in the form of a felt with interlacing fibres held together by the clay binder. The amount of water used determines the thickness of the resulting paper. Thus, if a large amount of water is used, a relatively thin paper is obtained, and conversely if less water is used, the paper is proportionately thicker.

The resulting insulating paper has high heat insulation and resisting properties, and is efficient over a long period of time. It also has considerable strength. In the appended claims, it is to be understood that I employ the term "paper" to cover insulating board as well as paper. The paper may be used in its natural form, or may be rolled into cylinder form to provide pipe covering, or may be utilized in making various other insulating products.

I claim as my invention:—

1. A heat insulating paper comprising interlaced slag wool and asbestos fibres, and a binder.

2. A heat insulating paper comprising slag wool fibre, asbestos fibre, and colloidal clay.

3. A heat insulating paper comprising slag wool fibre obtained from lead slag, asbestos fibre and clay.

4. A heat insulating paper comprising the following ingredients in substantially the following proportions by weight:

| | Per cent |
|---|---|
| Slag wool fibre | 80 |
| Asbestos fibre | 15 |
| Binder | 5 |

5. A heat insulating paper comprising the following ingredients in substantially the following proportions by weight:

| | Per cent |
|---|---|
| Slag wool fibre obtained from lead slag | 80 |
| Asbestos fibre | 15 |
| Colloidal clay | 5 |

In testimony whereof, I have hereunto affixed my signature.

LOUIS WEBER.